(12) United States Patent
Healy et al.

(10) Patent No.: US 7,284,915 B2
(45) Date of Patent: Oct. 23, 2007

(54) INTERFACE APPARATUS, CONNECTOR APPARATUS AND METHOD OF REDUCING ELECTROMAGNETIC INTERFERENCE

(75) Inventors: David Healy, Stowmarket (GB); Keith Everett, Bury St Edmunds (GB); Mark Jeffrey Dunn, Ipswich (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 137 days.

(21) Appl. No.: 10/928,393

(22) Filed: Aug. 27, 2004

(65) Prior Publication Data

US 2005/0058410 A1    Mar. 17, 2005

(30) Foreign Application Priority Data

Sep. 13, 2003    (GB) ............................... 03215023.7

(51) Int. Cl.
*G02B 6/36*    (2006.01)
*C03C 17/00*    (2006.01)

(52) U.S. Cl. ..................... 385/92; 385/78; 385/88; 427/163.1

(58) Field of Classification Search ................. 385/60, 385/72, 78, 88, 89, 92; 427/163.1
See application file for complete search history.

(56) References Cited

U.S. PATENT DOCUMENTS

| | | | |
|---|---|---|---|
| 4,598,974 A * | 7/1986 | Munn et al. ............... | 385/96 |
| 6,206,582 B1 * | 3/2001 | Gilliland ...................... | 385/92 |
| 6,439,781 B1 | 8/2002 | Gaio et al. ................... | 385/92 |
| 6,929,406 B2 * | 8/2005 | Amorim ...................... | 385/92 |
| 6,994,478 B1 * | 2/2006 | Chiu et al. .................... | 385/92 |

OTHER PUBLICATIONS

Patent Abstracts of Japan, Publication No. JP 2000121885.

* cited by examiner

*Primary Examiner*—Brian Healy
*Assistant Examiner*—Charlie Peng

(57) ABSTRACT

A subassembly apparatus includes a substantially shieldable interior chamber for housing at least one source of electromagnetic radiation, a connector plane external to the interior chamber for locating an end surface of a connector, and a launch window for locating an end surface of a waveguide, where the launch window is in or adjacent the connector plane. The apparatus also includes an internal propagation path extending from the interior chamber to the launch plane including a barrier of electrically conductive material disposed in the propagation path, the barrier being arranged to shield a planar region from electromagnetic radiation emitted from within the interior chamber, the planar region including substantially the connector plane substantially excluding the launch window.

15 Claims, 1 Drawing Sheet

INTERFACE APPARATUS, CONNECTOR APPARATUS AND METHOD OF REDUCING ELECTROMAGNETIC INTERFERENCE

BACKGROUND OF THE INVENTION

1. Field of the Invention

The present invention relates to an interface apparatus of the type used, for example, to couple an end of a waveguide and an electromagnetically shielded housing, such as an end of an optical fibre and a subassembly of an optoelectronic module. The present invention also relates to a connector apparatus of the type, for example, for carrying an end of a waveguide, for example an optical fibre, for coupling to an electromagnetically shielded housing, such as an optoelectronic module. The present invention also relates to a method of reducing electromagnetic radiation leakage from a coupling between a connector for carrying an end portion of a waveguide, such as an optical fibre, and an electromagnetically shielded housing.

2. Brief Description of Related Developments

A great deal of attention is given, by both users and standards committees, to Electromagnetic Interference (EMI) performance of optoelectronic products, especially as the frequency at which signals are processed increases. Manufacturers of optoelectronic products invest a great deal of time and effort into ensuring that electromagnetic emissions from such products are kept to a minimum and that the optoelectronic products are also well-protected from external sources of EMI that might interfere with the operation of the optoelectronic products.

Although careful electrical design of both the assembly and individual electronic components, such as Integrated Circuits (ICs), of an optoelectronic product is important, shielding the electronic components from the outside world as efficiently as possible is usually the most effective known way to maximise the performance of the optoelectronic product. It is therefore known to contain the electronic components within a metallic housing, which can be grounded to form an efficient EMI shield.

In the case of optoelectronic modules, however, it is usually necessary to provide some form of optical interface, usually in the form of an optical connector, for example to form part of a pig-tail assembly, to couple an end of an optical fibre to a port of the optoelectronic module.

In order for tolerances, required for good optical connections between the optical fibre and the optoelectronic module, to be met, it is common for so-called "connector assemblies" to be based around non-metallic materials, such as ceramics or precision moulded plastics. In order to further ensure good optical coupling, light entering or leaving the optical fibre typically propagates through a lens provided as part of the port of the optoelectronic module.

However, whilst a majority of the housing for the optoelectronic module is usually metallic, the ceramic components and the lens provide a large aperture through which any electromagnetic radiation emitted by the active devices contained within the optoelectronic module, can escape. Emissions from the port and the connector assembly are often the greatest source of radiated EMI from this type of optoelectronic module. As mentioned above, as the frequency at which signals are processed increases, electromagnetic emissions through the port and the connector assembly can increase.

BRIEF DESCRIPTION OF THE DRAWINGS

According to a first aspect of the present invention, there is provided a subassembly apparatus comprising: substantially shieldable interior chamber for housing at least one source of electromagnetic radiation; a connector plane external to the interior chamber for locating an end surface of a connector; a launch window for locating an end surface of a waveguide, the launch window being in or adjacent the connector plane; and an internal propagation path extending from the interior chamber to the launch plane; characterised by a barrier of electrically conductive material disposed in the propagation path, the barrier being arranged to shield a planar region from electromagnetic radiation emitted from within the interior chamber, the planar region comprising substantially the connector plane substantially excluding the launch window.

A focusing device may be disposed in the propagation path, the focusing device comprising the barrier.

Figure 1:
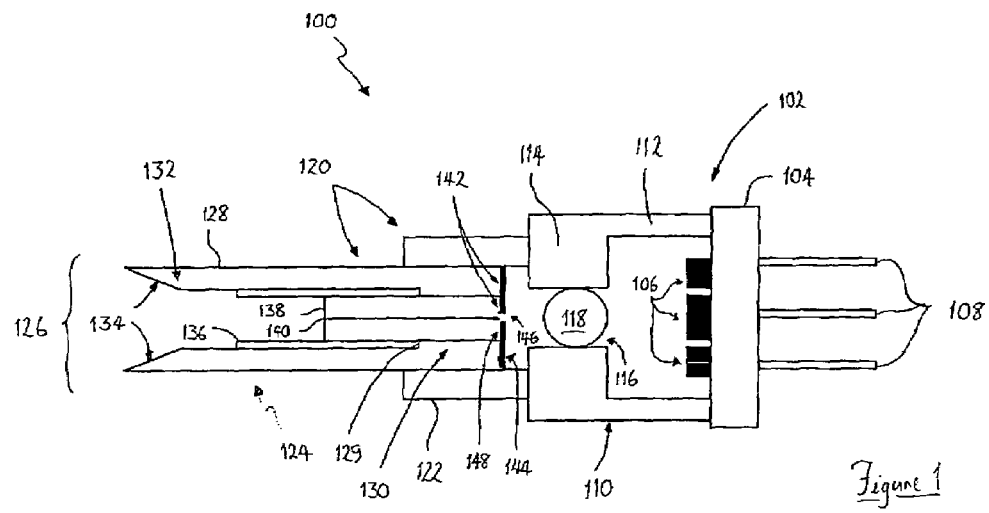

The apparatus may further comprise a port having an electrically conductive inner surface; and a connector for carrying an end portion of the waveguide, the connector having the end surface disposable in the connector plane, and at least part of the connector is formed from an electrically insulating material, the at least part of the connector having an end face for location within the port; wherein the barrier is disposed adjacent the end face of the at least part of the connector for preventing electromagnetic radiation propagating through at least part of the end face.

The barrier may be a layer of electrically conductive material. If employed, the layer may be a coating. In any event, the barrier may be metallic.

The barrier may comprise an aperture for exposing an end surface of the waveguide.

The barrier may be arranged to contact, when in use, the electrically conductive port, for example an electrically conductive inner surface of the port. In this respect, the barrier may extend to contact the electrically conductive inner surface of the port. Alternatively, the apparatus may further comprise an electrically conductive contact for electrically coupling the barrier to the electrically conductive inner surface of the port.

The connector may be removable, or the connector may be a non-removable pig-tail assembly.

According to a second aspect of the present invention, there is provided a method of reducing electromagnetic interference leakage from a substantially shieldable interior chamber of a subassembly apparatus to a planar region, the planar region comprising substantially a connector plane external to the interior chamber, but substantially excluding a launch window, the launch window being in or adjacent the connector plane; the method being characterised by the steps of providing a barrier of electrically conductive material disposed in the propagation path, the barrier being arranged to shield the planar region from electromagnetic radiation emitted from within the interior chamber.

According to a third aspect of the present invention, there is provided a connector apparatus for carrying an end portion of a waveguide, the apparatus comprising: a body portion, at least part of the body portion being formed from an electrically insulating material, the at least part of the body portion having an end face for location within a port of an electromagnetically shieldable housing; characterised by: a barrier of electrically conductive material disposed adjacent the end face of the at least part of the body portion for preventing electromagnetic radiation propagating through at least part of the end face.

According to a fourth aspect of the present invention, there is provided a focusing element for an optoelectronic subassembly, the element characterised by a barrier of electrically conductive material disposed upon a surface thereof, the barrier lying in a propagation path between a source of electromagnetic radiation and a planar region, wherein the barrier is arranged to shield the planar region from the electromagnetic radiation.

It is thus possible to provide an interface apparatus, connector apparatus and a method capable of reducing leakage of electromagnetic radiation from an electromagnetically shielded housing, where the housing has an unshielded opening for coupling an end of a waveguide thereto. It therefore follows that susceptibility of devices inside the housing to external EMI is also reduced. Additionally, the reduction of leakage is provided in a low-cost manner.

BRIEF DESCRIPTION OF THE DRAWINGS

At least one embodiment of the invention will now be described, by way of example only, with reference to the accompanying drawings, in which:

FIG. 1 is a cross-sectional view of a schematic diagram of an optoelectronic subassembly coupled to a first type of connector constituting an embodiment of the invention.

Figure 2:
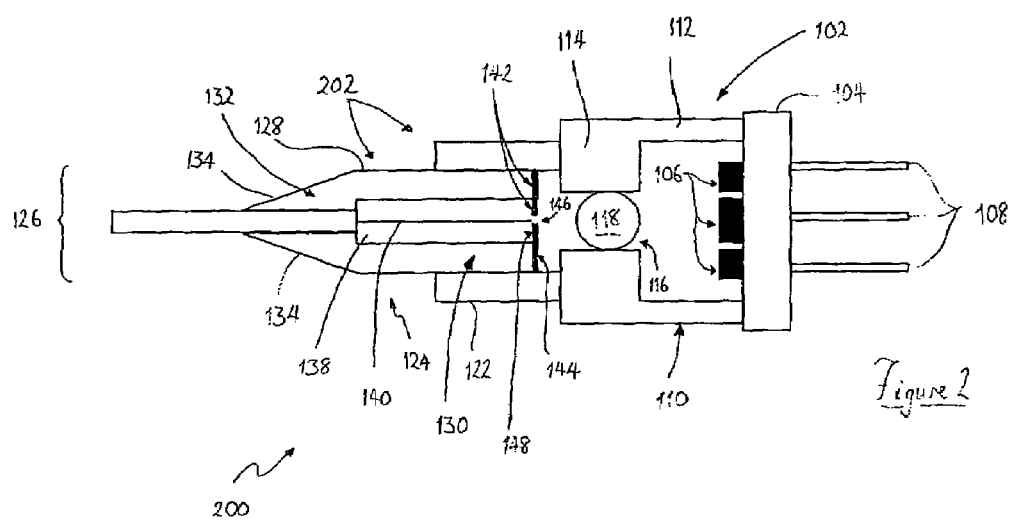

FIG. 2 is a cross-sectional view of a schematic diagram of an optoelectronic subassembly coupled to a second type of connector constituting another embodiment of the invention.

DETAILED DESCRIPTION OF THE PREFERRED EMBODIMENT(s)

Throughout the following description, identical reference numerals will be used to identify like parts.

Referring to FIG. 1, an optoelectronic connectorised assembly 100 comprises a metallic housing 102 comprising a so-called "CD header" 104 carrying a number of electronic and/or optoelectronic active devices 106, some of the active devices 106 being coupled to one or more pins 108 for communicating electrical signals to and from the optoelectronic connectorised assembly 100.

A metallic surround 110 is fixed to the CD header 104, for example by soldering, the surround 110 comprising a first circumferential side-wall 112 and a cover wall 114, the cover wall 114 having a thickness greater than a thickness of the side-wall 112. A central aperture 116 is disposed in the cover wall 114 and a ball lens 118 is located within the aperture 116.

A connector assembly 120 is fixed to the metallic surround 110, for example by soldering, the connector assembly 120 comprising a second circumferential metallic wall 122 constituting a port for receiving a connector 124. Whilst the port, in this example comprises the second circumferential metallic wall 122, the circumferential wall 122 can simply comprise an electrically conductive internal surface, for example as a result of metallisation, electrically coupleable to ground potential.

The connector 124 has a removable cylindrical body 126 comprising an electrically conductive, in this example metallic, external wall 128 that is annular in cross-section and has a first internal radius, the cylindrical body 126 having a proximal end 130 and a distal end 132. At the proximal end 130 of the cylindrical body 126, the external wall 128 comprises an internal shoulder 129 that serves to thicken the external wall 128, thereby reducing the first internal radius to a second, smaller, internal radius. The cylindrical body 126 has a substantially planar end face 142 that lies within the port when the connector 124 is in a coupled state with respect to the housing 102. The ferrule and face 142 lies within a "connector plane" (not shown) external to the housing 102, a launch window lying either within the connector plane or adjacent the connector plane. The launch window corresponds to an end face of the optical fibre 140. A propagation path extends from the interior of the housing 102 to the ferrule 138. At the distal end 132 of the cylindrical body 126, the external wall 128 tapers inwardly towards the proximal end 130 to form a bevelled internal surface 134.

An internal sleeve 136, having the second internal radius, is disposed within the external wall 128, the sleeve 136 abutting the shoulder 129. The sleeve 136 is provided to ensure aligned coupling of a ceramic ferrule 138 and a corresponding ferrule (not shown) of a so-called "patch card" along an optical axis.

The ceramic ferrule 138 carries a waveguide, for example, an optical fibre 140 and is located within the cylindrical body 126, a ferrule end face 148 constituting part of the substantially planar end face 142. Although the ceramic ferrule 138 is described herein, any other suitable non-electrically conductive component can be employed in place of the ferrule 138.

The ferrule end face 142 lies within a "connector plane" (not shown) external to the housing 102, a launch window lying either within the connector plane or adjacent the connector plane. The launch window corresponds to an end face of the optical fibre 140. A propagation path extends, in this example, from the interior of the housing 102 to the ferrule 138.

A metallic layer or coating 144 is disposed over the end face 142 and comprises an aperture 146 in registry with a cross-section of the optical fibre 140 to enable light to enter or leave the housing 102 via the optical fibre 140. The coating 144 lies in the propagation path and serves as an electromagnetic radiation barrier between the non-metallic, non-electricity conductive, ferrule 138 and the active devices 106. Since the external wall 128 of the connector 124 and the metallic coating 144 are electrically conductive, it is possible to electrically couple the metallic coating 144 to ground potential via the second circumferential wall 122. However, should the metallic coating 144 be disposed such that electrical coupling does not exist between the metallic coating 144 and the second circumferential wall 122, a separate connection between the coating 144 and the circumferential wall 122 can be provided using, for example, solder or conductive epoxy. For example, the metallic coating 144 can be arranged not to overlie an end surface of the external wall 128.

In operation (and in the coupled state), the active devices 106 generate electromagnetic emissions due to the speed at which signals are processed by the active devices 106. Initial containment of the electromagnetic emissions within the housing 102 is achieved on account of the housing 102 being coupled to the ground potential when the active devices 106 are operational. Due to the electrical contact between the inner surface of the second circumferential wall 122 of the port and the coating 148 and the inner surface of the second circumferential wall 122 and the housing 102, an electromagnetic interference shield is provided, at least, across an end face 148 of the non-electrically conductive ferrule 138, thereby minimising leakage of the electromagnetic emissions via the connector assembly 120.

Referring to FIG. 2, a so-called "optoelectronic pig-tailed assembly" 200 comprises a metallic housing 102 comprising a so-called "CD header" 104 carrying a number of electronic and for optoelectronic active devices 106, some of the active devices 106 being coupled to one or more pins 108 for communicating electrical signals to and from the optoelectronic pig-tailed assembly 200.

A metallic surround 110 is fixed to the CD header 104, for example by soldering, the surround 110 comprising a first circumferential side-wall 112 and a cover wall 114, the cover wall 114 having a thickness greater than a thickness of the side-wall 112. A central aperture 116 is disposed in the cover wall 114 and a ball lens 118 is located within the aperture 116.

A pig-tail assembly 202 is fixed to the metallic surround 110, for example by soldering, the pig-tailed assembly 202 comprising a second circumferential metallic wall 122 constituting a port within which a connector 124 is fixed, i.e. it is not intended that the connector 124 be removed from the port during normal use of the optoelectronic pig-tailed assembly 200. Typically, the housing 102 is first formed and the port is subsequently attached to the housing 102 before the connector 124 is finally inserted into the port and fixed therein. Whilst the port, in this example comprises the second circumferential metallic wall 122, the circumferential wall 122 can simply comprise an electrically conductive internal surface, for example as a result of metallisation, electrically coupleable to ground potential.

The connector 124 has a cylindrical body 126 comprising an electrically conductive, in this example metallic, external wall 128 that is annular in cross-section and has a first internal radius. The cylindrical body 126 has a proximal end 130 and a distal end 132, the external wall 128 comprising an internal shoulder 129 that serves to thicken the external wall 128 at the distal end 132, thereby reducing the first internal radius to a second, smaller, internal radius. The cylindrical body 126 has a substantially planar end face 142 that lies within the port as a result of the connector 124 being disposed, in a fixed manner, within the port. At the distal end 132 of the cylindrical body 126, the external wall 128 tapers inwardly away from the proximal end 130 to form an external bevelled surface 134.

A ceramic ferrule 138 carrying a waveguide, for example, an optical fibre 140 is located within the cylindrical body 128, the ferrule 138 abutting the shoulder 129 and having a ferrule end face 148 constituting part of the substantially planar end face 142. Although the ceramic ferrule 138 is described herein, any other suitable non-electrically conductive component can be employed in place of the ferrule 138. The optical fibre 140 extends out of the ferrule 138 at the distal end 132, but is protected by cladding 204. The cladding 204 abuts the ferrule 138 and the clad optical fibre 140, 204 extends along a conduit, provided by the thickened part of the external wall 128 of the second internal radius, and out of the connector 124 at the distal end 132 to provide a predetermined length of optical fibre terminating as a so-called fibre "pig-tail".

The ferrule end face 142 lies within a "connector plane" (not shown) external to the housing 102, a launch window lying either within the connector plane or adjacent the connector plane. The launch window corresponds to an end face of the optical fibre 140. A propagation path, in this example, extends from the interior of the housing 102 to the ferrule 138.

A metallic layer or coating 144 is disposed over the end face 142 and comprises an aperture 146 in registry with a cross-section of the optical fibre 140 to enable light to enter or leave the housing 102 via the optical fibre 140. The coating 144 lies in the propagation path and serves as an electromagnetic radiation barrier between the non-metallic, non-electrically conductive, ferrule 138 and the active devices 106. Since the external wall 128 of the connector 124 and the metallic coating 144 are electrically conductive, it is possible to electrically couple the metallic coating 144 to ground potential via the second circumferential wall 122. However, should the metallic coating 144 be disposed such that electrical coupling does not exist between the metallic coating 144 and the second circumferential wall 122, a separate connection between the coating 144 and the circumferential wall 122 can be provided using, for example, solder or conductive epoxy. For example, the metallic coating 144 can be arranged not to overlie an end surface of the external wall 128.

In operation, the active devices 106 generate electromagnetic emissions due to the speed at which signals are processed by the active devices 106. Initial containment of the electromagnetic emissions within the housing 102 is achieved on account of the housing 102 being coupled to the ground potential when the active devices 106 are operational. Due to the electrical contact between the inner surface of the second circumferential wall 122 of the port and the coating 144 and the inner surface of the second circumferential wall 122 and the housing 102, an electromagnetic interference shield is provided, at least, across an end face 148 of the non-electrically conductive ferrule 138, thereby minimising leakage of the electromagnetic emissions via the pig-tailed assembly 202.

Whilst, in the above examples, the barrier is formed across the entire surface of the end face 142, it should be understood that other configurations are contemplated whereby the barrier is simply only disposed adjacent a non-metallic part of the connector 124 at the end face 142 as mentioned above. For example, the ferrule 138 can be recessed with respect to the third circumferential wall 128 and the recess filled with an electrically conductive material. The aperture 146 would still be provided, in registry with the cross-section of the optical fibre 140, to enable non-Radio Frequency (non-RF) electromagnetic radiation to enter or leave the housing 102 via the optical fibre 140.

From the above examples it should be understood that individual parts described above need not be formed from electrically conductive materials, such as metals. As an alternative one or more part can be formed from an electrically insulating material and subsequently provided with an electrically conductive coated, such as a metallic coating.

With regard to the barrier, such as the layer or coating 144 described above, the aperture 146 can, for example, be provided with a 0.125 mm diameter, corresponding to a diameter of the optical fibre 140. An approximate calculation of the effectiveness of the resultant shield when the barrier is coupled to ground potential is set out below.

An effective penetration depth of an electromagnetic wave in a conductive medium can be defined in terms of a so-called "skin depth", $\delta$. The skin depth, $\delta$, of the shielding layer 144 is the depth within the material, from which the layer is formed, at which the electromagnetic wave has decayed to 1/e of the original field strength of the electromagnetic wave.

$$\delta \approx \sqrt{\frac{\rho}{f\mu_0\pi}}\, m \qquad (1)$$

Where: f is the frequency, in Hertz, of electromagnetic radiation from which shielding is required, $\mu_0$ is the permeability of free space ($4\pi \times 10^{-7}$ Hm$^{-1}$), and $\rho$ is the resistivity, in $\Omega$m, of the material from which the shielding layer is formed.

An absorption loss, A, in the material of the shielding layer 144, when the layer 144 has a thickness, t, can then be expressed as:

$$A \approx 8.69\left(\frac{t}{\delta}\right) \text{dB} \quad (2)$$

A material, such as silver, has a resistivity, $\rho$, of approximately 1.59 $\mu\Omega$cm and can easily be applied to non-metallic components in the form of a thin film. Using equation (1) above, the skin depth necessary for a silver film can be calculated for different frequencies of electromagnetic radiation emitted (see Table 1 below).

TABLE 1

| Frequency (GHz) | Skin Depth (µm) |
|---|---|
| 5.0 | 0.90 |
| 10.0 | 0.63 |
| 20.0 | 0.45 |
| 40.0 | 0.32 |

From Table 1 and equation (2) above, it can be seen that a thin film of the order of microns in thickness can offer a significant attenuation of electromagnetic radiation, particularly for relatively high frequencies, which are often the most difficult to prevent leaking from optoelectronic assemblies.

However, the film would not provide complete shielding due to the presence of the aperture 146 to allow the light to pass therethrough. In this respect, a shielding effectiveness, S, of the aperture 146 can be calculated using the following equation:

$$S \approx 20 \log\left(\frac{\lambda}{2l}\right) \quad (3)$$

Where: $\lambda$ is the wavelength of the electromagnetic radiation from which shielding is required, and l is the maximum dimension, for example diameter, of the aperture.

A typical known optoelectronic assembly radiates electromagnetic radiation at frequencies of up to and including approximately 40 GHz, corresponding to a wavelength of 7.5 mm. Using equation (3), the shielding effectiveness, S, of the aperture 146 required to accommodate the optical fibre of the diameter of 0.125 mm mentioned above is:

$$S = 20 \log\left(\frac{7.5 \text{ mm}}{0.25 \text{ mm}}\right) \approx 29 \text{ dB}$$

Consequently, apertures of sizes of the order of the diameter of an optical fibre provide a significant level of shielding.

It should be appreciated that references to "light" herein refer to desired wavelengths of electromagnetic radiation for which launch into the waveguide is required, for example, non-Radio Frequency (RF) electromagnetic radiation of wavelengths between about 300 nm and about 10 µm, such as between about 400 nm and about 2 µm, and/or between about 800 nm and about 1700 nm.

Whilst the above examples are directed to apply a barrier to a part of a connector, it should be appreciated that the barrier can be provided at any suitable location along the propagation path between an interior chamber, for example the interior of the housing 102, and the connector plane external to the interior chamber, where the propagation path lies in a mostly, but not completely, electromagnetically shielded environment. The provision of the barrier prevents escape of undesirable EMI through parts of the connector plane where the launch window does not lie or area(s) with which the launch window does not lie adjacent the connector plane.

What is claimed is:

1. A subassembly apparatus comprising:
    a housing with a substantially shieldable interior chamber for housing at least one source of electromagnetic radiation;
    a connector plane external to the housing for locating an end surface of a connector;
    a launch window for locating an end surface of a waveguide, the launch window being in or adjacent to the connector plane;
    an internal propagation path extending from the interior chamber to the connector plane; and
    a metallic coating on the end surface of the connector in the propagation path, the metallic coating and the connector being fixed to each other, the metallic coating being arranged to shield a planar region from the electromagnetic radiation emitted from within the interior chamber, the planar region comprising substantially the connector plane substantially excluding the launch window, the metallic coating defining an aperture having a diameter that corresponds to a diameter of the waveguide and substantially exposes only the end surface of the waveguide to the electromagnetic radiation.

2. An apparatus as claimed in claim 1, wherein a focusing device is disposed in the propagation path, the focusing device comprising the metallic coating.

3. An apparatus as claimed in claim 1, further comprising:
    a port having an electrically conductive inner surface, wherein
    a ferrule in the connector carries an end portion of the waveguide, and at least the ferrule is formed from an electrically insulating material, and wherein
    the metallic coating is on at least part of an end surface of the ferrule for preventing the electromagnetic radiation from propagating through the at least part of the end surface of the ferrule.

4. An apparatus as claimed in claim 3, wherein the metallic coating is arranged to contact the electrically conductive inner surface of the port or an electrically conductive surface of the inner chamber.

5. An apparatus as claimed in claim 4, wherein the metallic coating extends to contact the electrically conductive surface.

6. An apparatus as claimed in claim 4, further comprising an electrically conductive contact for electrically coupling the metallic coating to the electrically conductive surface.

7. An apparatus as claimed in claim 1, wherein the connector is removable.

8. An apparatus as claimed in claim 1, wherein the connector is a non-removable pig-tail assembly.

9. An apparatus as claimed in claim 1, wherein a focusing device is disposed in the propagation path, the focusing device comprising a ball lens mounted to the housing.

10. A method of reducing electromagnetic interference leakage from a housing of a subassembly apparatus to a planar region, the planar region comprising substantially a connector plane external to the housing, but substantially excluding a launch window for a waveguide in a connector, the launch window being in or adjacent to the connector plane, the method comprising:
   forming a metallic coating on an end surface of the connector located on the connector plane and in the propagation path, the metallic coating and the connector being fixed to each other; and
   arranging the metallic coating to shield the planar region from electromagnetic radiation emitted from within the housing, the metallic coating defining an aperture having a diameter that corresponds to a diameter of the waveguide and substantially exposes only an end surface of the waveguide to the electromagnetic radiation.

11. A connector apparatus for carrying an end portion of a waveguide, the apparatus comprising:
   a body portion, at least part of the body portion being formed from an electrically insulating material, the at least part of the body portion having an end face for location within a port of an electromagnetically shieldable housing;
   a connector plane external to the electromagnetically shieldable housing for locating the end face;
   a waveguide within the body portion; and
   a metallic coating on the end face for preventing electromagnetic radiation propagating through at least part of the end face, the metallic coating defining an aperture having a diameter that corresponds to a diameter of the waveguide and substantially exposes only an end face of the waveguide to the electromagnetic radiation.

12. An apparatus as claimed in claim 11, wherein the at least part of the body comprises a ferrule that carries the waveguide.

13. A subassembly apparatus comprising:
   a housing with a substantially shielded chamber for enclosing at least one source of electromagnetic radiation;
   a connector coupled to the housing, the connector comprising:
   an electrically conductive connector body;
   an electrically non-conductive ferrule in the connector body;
   a waveguide in the ferrule;
   a metallic coating on an end face of the connector body and an end face of the ferrule, the metallic coating defining an aperture about an end face of the waveguide, the aperture having a diameter that corresponds to a diameter of the waveguide so the aperture only exposes the waveguide to the electromagnetic radiation.

14. The apparatus as claimed in claim 13, further comprising a lens fitted in an opening of the housing.

15. The apparatus as claimed in claim 13, wherein the metallic coating is electrically coupled to the connector body to shunt the electromagnetic radiation.

* * * * *